Lanphear & Blair,
Bed Bottom,

No. 55,678. Patented June 19, 1866.

Witnesses:
A. W. McClellan
E. E. Waite

Inventors
S. E. Lanphear
H. H. Blair

UNITED STATES PATENT OFFICE.

S. E. LANPHEAR AND H. H. BLAIR, OF BRUNSWICK, OHIO.

IMPROVED BED-BOTTOM.

Specification forming part of Letters Patent No. 55,678, dated June 19, 1866.

*To all whom it may concern:*

Be it known that we, S. E. LANPHEAR and H. H. BLAIR, of Brunswick, in the county of Medina and State of Ohio, have invented certain new and useful Improvements in Bed-Bottoms; and we do hereby declare that the following is a full and complete description of the same, reference being had to the accompanying drawings, making a part of this specification, in which—

Figure 1:
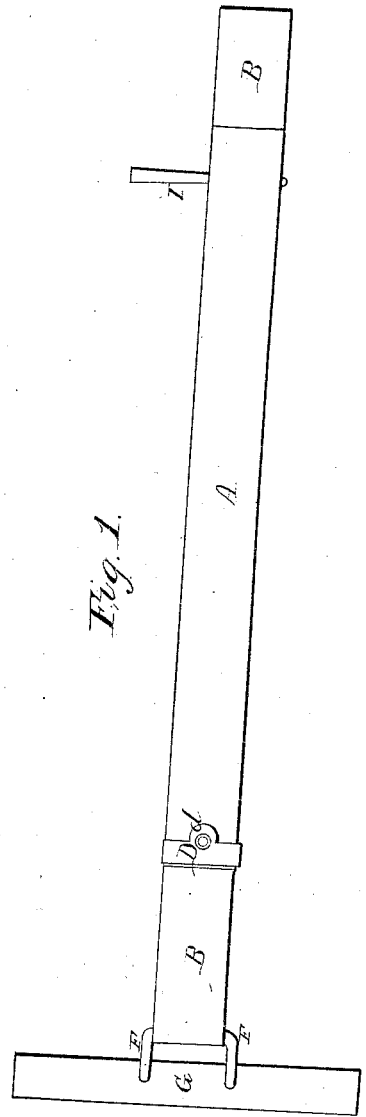
Figure 2:
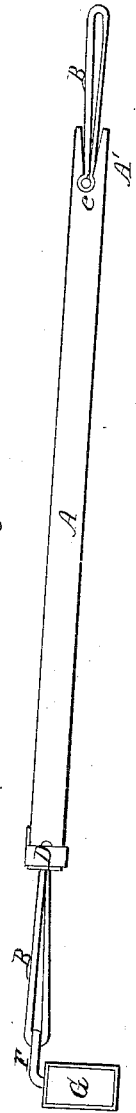

Figure 1 is a top view of one of the slats. Fig. 2 is a side view of the same.

Like letters of reference refer to like parts in the views.

The figures represent one of the slats of a bed-bottom, showing the manner of its construction. It consists of a wooden slat, A, and elastic springs B at each end. The springs are connected to the slats in the following manner: There is a hole made near each end of the slat, from which it is slotted or cut out, leaving the hole $e$ or inner end of the slot enlarged, as shown at A' in Fig. 2. The spring B, or elastic webbing of a suitable length, is sewed together at the ends and inserted in the end of the slat, when a pin, I, is put into the hole $e$ at one side, through the end of the spring, which it presses out round in the hole, and the hole being larger than the space cut out, as before stated, the spring cannot be withdrawn from the slat, but will be fastened securely to it.

To make the end of the slat stronger and prevent it from splitting, whatever pressure there may be upon it, and to render the fastening of the spring still more secure, a clasp or collar, D, is put on the end, as represented. If desired, the collar may be attached to the slat by putting a pin or screw through the hole $d$, Fig. 1, into the slat. Through the outer end of the loop or spring is put a staple, F, that is secured in a cleat, G, whereby the slat is connected to the sides of the bed.

This manner of attaching the springs or loops B to the slat is very simple and economical, and forms a secure and permanent fastening.

What we claim as our improvement, and desire to secure by Letters Patent, is—

The elastic loop B, pin I, and collar D, as arranged, and in combination with the slat A, staple F, and cleat G, for the purpose and in the manner set forth.

STEPHEN E. LANPHEAR.
H. H. BLAIR.

Witnesses:
O. H. P. HICKS,
JAMES A. ROOT.